United States Patent
Bloom et al.

[11] Patent Number: 5,841,579
[45] Date of Patent: Nov. 24, 1998

[54] FLAT DIFFRACTION GRATING LIGHT VALVE

[75] Inventors: David M. Bloom, Portola Valley; Dave B. Corbin, Los Altos Hills; William C. Banyai, East Palo Alto; Bryan P. Straker, Palo Alto, all of Calif.

[73] Assignee: Silicon Light Machines, Sunnyvale, Calif.

[21] Appl. No.: 482,188

[22] Filed: Jun. 7, 1995

[51] Int. Cl.$^6$ .............................. G02B 5/18; G02B 26/00; G02B 26/08; G09G 3/34
[52] U.S. Cl. .......................... 359/572; 359/290; 359/291; 359/224; 359/226; 345/108
[58] Field of Search ...................................... 359/872, 295, 359/290, 224, 226; 345/108; 348/203

[56] References Cited

U.S. PATENT DOCUMENTS

| | | |
|---|---|---|
| Re. 16,767 | 10/1927 | Jenkins . |
| 1,525,550 | 2/1925 | Jenkins . |
| 1,548,262 | 8/1925 | Freedman . |

(List continued on next page.)

FOREIGN PATENT DOCUMENTS

| | | | |
|---|---|---|---|
| 0 417 039 A1 | 3/1991 | European Pat. Off. | ........ G03B 21/20 |
| 0 610 665 A1 | 8/1994 | European Pat. Off. | .......... G09G 3/34 |
| 0 658 868 A1 | 6/1995 | European Pat. Off. | .......... G09G 3/34 |
| 63-305323 | 12/1988 | Japan | ................................ G02F 1/13 |
| WO 093/02269 | 2/1993 | WIPO | ............................... E06B 5/10 |
| WO 093/09472 | 5/1993 | WIPO | ............................... G03F 7/20 |

OTHER PUBLICATIONS

R. Apte, F. Sandejas, W. Banyai, D. Bloom, "Grating Light Valves For High Resolution Displays", Solid State Sensor and Actuators Workshop, Hilton Head Island, SC (Jun. 13–16, 1994).

R. Apte, Grating Light Valves For High Resolution Displays Jun., 1994.

O. Solgaard, *Integrated Semiconductor Light Modulators For Fiber–Optic And Display Applications*, Feb., 1992.

J. Neff, "Two–Dimensional Spatial Light Modulators: A Tutorial", *Proceedings of the IEEE*, vol. 78, No. 5 (May 1990), pp. 826–855.

Gerhard–Multhaupt, "Viscoelastic Spatial Light Modulators and Schlieren–Optical Systems for HDTV Projection Displays", *SPIE vol. 1255 Large Screen Projection Displays II* (1990), pp. 69–78.

Gerhard–Multhaupt, "Light–Valve Technologies for High–Definition Television Projection Displays", *Displays*, vol. 12, No. 3/4 (1991), pp. 115–128.

(List continued on next page.)

*Primary Examiner*—Paul M. Dzierzynski
*Assistant Examiner*—Audrey Chang
*Attorney, Agent, or Firm*—Haverstock & Owens LLP

[57] ABSTRACT

A diffraction grating light valve modulates an incident beam of light. A plurality of elongated elements each have a reflective surface. The elongated elements are suspended with their respective ends substantially coplanar. Alternate ones of the elongated elements are electrically coupled for receiving a first bias voltage. The interdigitated elongated elements are electrically coupled for receiving a second bias voltage. By applying a appropriate first and second biasing voltages, all the reflective surfaces can be maintained in a first plane. When all the elongated elements are in the first plane, the diffraction grating light valve reflects the beam of light. A predetermined group of the elongated elements, preferably alternate ones, are deformable to be substantially coplanar in a second plane which is parallel to the first plane. When the predetermined group of elements is in the second plane, the diffraction grating light valve diffracts the beam of light.

10 Claims, 4 Drawing Sheets

U.S. PATENT DOCUMENTS

| | | | |
|---|---|---|---|
| 1,814,701 | 7/1931 | Ives . | |
| 2,415,226 | 2/1947 | Sziklai | 178/5.4 |
| 2,783,406 | 2/1957 | Vanderhooft | 313/70 |
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,802,796 | 4/1974 | Rotz et al. | 352/43 |
| 3,886,310 | 5/1975 | Guldberg et al. | 178/7.5 D |
| 3,896,338 | 7/1975 | Nathanson et al. | 315/373 |
| 3,935,499 | 1/1976 | Oess | 313/413 |
| 3,935,500 | 1/1976 | Oess et al. | 313/495 |
| 3,947,105 | 3/1976 | Smith | 353/121 |
| 3,969,611 | 7/1976 | Fonteneau | 219/502 |
| 4,001,663 | 1/1977 | Bray | 321/2 |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,067,129 | 1/1978 | Abramson et al. | 40/563 |
| 4,084,437 | 4/1978 | Finnegan | 73/361 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,127,322 | 11/1978 | Jacobson et al. | 353/31 |
| 4,135,502 | 1/1979 | Peck | 128/76.5 |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,327,411 | 4/1982 | Turner | 364/900 |
| 4,327,966 | 5/1982 | Bloom | 350/162 R |
| 4,338,660 | 7/1982 | Kelley et al. | 364/200 |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,468,725 | 8/1984 | Venturii | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,746 | 5/1987 | Hornbeck | 350/269 |
| 4,663,670 | 5/1987 | Ito et al. | 358/245 |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 339/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovsky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |
| 5,148,506 | 9/1992 | McDonald | 385/16 |
| 5,151,718 | 9/1992 | Nelson | 346/160 |
| 5,155,604 | 10/1992 | Miekka et al. | 359/2 |
| 5,155,778 | 10/1992 | Magel et al. | 185/18 |
| 5,155,812 | 10/1992 | Ehlig et al. | 395/375 |
| 5,159,485 | 10/1992 | Nelson | 359/291 |
| 5,161,042 | 11/1992 | Hamada | 359/41 |
| 5,162,787 | 11/1992 | Thompson et al. | 340/794 |
| 5,165,013 | 11/1992 | Faris | 395/104 |
| 5,168,406 | 12/1992 | Nelson | 359/855 |
| 5,170,156 | 12/1992 | DeMond et al. | 340/794 |
| 5,170,269 | 12/1992 | Lin et al. | 359/9 |
| 5,170,283 | 12/1992 | O'Brien et al. | 359/291 |
| 5,172,161 | 12/1992 | Nelson | 355/200 |
| 5,172,262 | 12/1992 | Hornbeck | 359/223 |

| | | | | | | | |
|---|---|---|---|---|---|---|---|
| 5,178,728 | 1/1993 | Boysel et al. | 156/656 | 5,371,543 | 12/1994 | Anderson | 348/270 |
| 5,179,274 | 1/1993 | Sampsell | 250/208.2 | 5,382,961 | 1/1995 | Gale, Jr. | 345/108 |
| 5,179,367 | 1/1993 | Shimizu | 340/700 | 5,387,924 | 2/1995 | Gale, Jr. et al. | 345/108 |
| 5,181,231 | 1/1993 | Parikh et al. | 377/26 | 5,389,182 | 2/1995 | Mignardi | 156/344 |
| 5,192,946 | 3/1993 | Thompson et al. | 340/794 | 5,392,140 | 2/1995 | Ezra et al. | 359/41 |
| 5,202,785 | 4/1993 | Nelson | 359/214 | 5,392,151 | 2/1995 | Nelson | 359/223 |
| 5,206,629 | 4/1993 | DeMond et al. | 340/719 | 5,398,071 | 3/1995 | Gove et al. | 348/558 |
| 5,212,555 | 5/1993 | Stoltz | 358/206 | 5,410,315 | 4/1995 | Huber | 342/42 |
| 5,212,582 | 5/1993 | Nelson | 359/224 | 5,411,769 | 5/1995 | Hornbeck | 427/534 |
| 5,214,419 | 5/1993 | DeMond et al. | 340/794 | 5,412,186 | 5/1995 | Gale | 219/679 |
| 5,214,420 | 5/1993 | Thompson et al. | 340/795 | 5,418,584 | 5/1995 | Larson | 353/122 |
| 5,216,537 | 6/1993 | Hornbeck | 359/291 | 5,420,655 | 5/1995 | Shimizu | 353/33 |
| 5,221,982 | 6/1993 | Faris | 359/93 | 5,430,524 | 7/1995 | Nelson | 355/200 |
| 5,226,099 | 7/1993 | Mignardi et al. | 385/19 | 5,435,876 | 7/1995 | Alfaro et al. | 156/247 |
| 5,231,363 | 7/1993 | Sano et al. | 332/109 | 5,442,411 | 8/1995 | Urbanus et al. | 348/771 |
| 5,231,388 | 7/1993 | Stoltz | 340/783 | 5,442,414 | 8/1995 | Janssen et al. | 353/98 |
| 5,233,456 | 8/1993 | Nelson | 359/214 | 5,444,566 | 8/1995 | Gale et al. | 359/291 |
| 5,237,340 | 8/1993 | Nelson | 346/108 | 5,445,559 | 8/1995 | Gale et al. | 451/388 |
| 5,237,435 | 8/1993 | Kurematsu et al. | 359/41 | 5,446,479 | 8/1995 | Thompson et al. | 345/139 |
| 5,240,818 | 8/1993 | Mignardi et al. | 430/321 | 5,447,600 | 9/1995 | Webb | 216/2 |
| 5,245,686 | 9/1993 | Faris et al. | 385/120 | 5,448,314 | 9/1995 | Heimbuch et al. | 348/743 |
| 5,247,180 | 9/1993 | Mitcham et al. | 250/492.1 | 5,448,546 | 9/1995 | Pauli | 369/112 |
| 5,247,593 | 9/1993 | Lin et al. | 385/17 | 5,450,088 | 9/1995 | Meier et al. | 342/51 |
| 5,254,980 | 10/1993 | Hendrix et al. | 345/84 | 5,450,219 | 9/1995 | Gold et al. | 359/40 |
| 5,255,100 | 10/1993 | Urbanus | 358/231 | 5,451,103 | 9/1995 | Hatanaka et al. | 353/31 |
| 5,256,869 | 10/1993 | Lin et al | 250/201.9 | 5,452,024 | 9/1995 | Sampsell | 348/755 |
| 5,262,000 | 11/1993 | Wellbourn et al. | 156/643 | 5,452,138 | 9/1995 | Mignardi et al. | 359/855 |
| 5,272,473 | 12/1993 | Thompson et al. | 345/7 | 5,453,747 | 9/1995 | D'Hont et al. | 342/42 |
| 5,278,652 | 1/1994 | Urbanus et al. | 358/160 | 5,453,778 | 9/1995 | Venkateswar et al. | 347/239 |
| 5,278,925 | 1/1994 | Boysel et al. | 385/14 | 5,453,803 | 9/1995 | Shapiro et al. | 353/119 |
| 5,280,277 | 1/1994 | Hornbeck | 345/108 | 5,454,906 | 10/1995 | Baker et al. | 216/66 |
| 5,281,957 | 1/1994 | Schoolman | 345/8 | 5,455,602 | 10/1995 | Tew | 347/239 |
| 5,285,196 | 2/1994 | Gale, Jr. | 345/108 | 5,457,493 | 10/1995 | Leddy et al. | 348/164 |
| 5,285,407 | 2/1994 | Gale et al. | 365/189.11 | 5,457,566 | 10/1995 | Sampsell et al. | 359/292 |
| 5,287,096 | 2/1994 | Thompson et al. | 345/147 | 5,458,716 | 10/1995 | Alfaro et al. | 156/245 |
| 5,287,215 | 2/1994 | Warde et al. | 359/293 | 5,459,492 | 10/1995 | Venkateswar | 347/253 |
| 5,289,172 | 2/1994 | Gale, Jr. et al. | 345/108 | 5,459,528 | 10/1995 | Pettitt | 348/568 |
| 5,291,317 | 3/1994 | Newswanger | 359/15 | 5,459,592 | 10/1995 | Shibatani et al. | 359/40 |
| 5,291,473 | 3/1994 | Pauli | 369/112 | 5,459,610 | 10/1995 | Bloom et al. | 359/572 |
| 5,293,511 | 3/1994 | Poradish et al. | 257/434 | 5,461,410 | 10/1995 | Venkateswar et al. | 347/240 |
| 5,296,950 | 3/1994 | Lin et al. | 359/9 | 5,461,411 | 10/1995 | Florence et al. | 347/240 |
| 5,299,037 | 3/1994 | Sakata | 359/41 | 5,461,547 | 10/1995 | Ciupke et al. | 362/31 |
| 5,301,062 | 4/1994 | Takahashi et al. | 359/567 | 5,463,347 | 10/1995 | Jones et al. | 330/253 |
| 5,303,055 | 4/1994 | Hendrix et al. | 348/761 | 5,465,175 | 11/1995 | Woodgate et al. | 359/463 |
| 5,307,056 | 4/1994 | Urbanus | 340/189 | 5,467,106 | 11/1995 | Salomon | 345/87 |
| 5,307,185 | 4/1994 | Jones et al. | 359/41 | 5,467,138 | 11/1995 | Gove | 348/452 |
| 5,311,349 | 5/1994 | Anderson et al. | 359/223 | 5,467,146 | 11/1995 | Huang et al. | 348/743 |
| 5,311,360 | 5/1994 | Bloom et al. | 359/572 | 5,469,302 | 11/1995 | Lim | 359/846 |
| 5,312,513 | 5/1994 | Florence et al. | 156/643 | 5,481,118 | 1/1996 | Tew | 250/551 |
| 5,313,479 | 5/1994 | Florence | 372/26 | 5,482,564 | 1/1996 | Douglas et al. | 134/18 |
| 5,313,648 | 5/1994 | Ehlig et al. | 395/800 | 5,482,818 | 1/1996 | Nelson | 430/394 |
| 5,315,418 | 5/1994 | Sprague et al. | 359/41 | 5,483,307 | 1/1996 | Anderson | 353/98 |
| 5,319,214 | 6/1994 | Gregory et al. | 250/504 R | 5,485,304 | 1/1996 | Kaeriyama | 359/291 |
| 5,319,789 | 6/1994 | Ehlig et al. | 395/800 | 5,485,354 | 1/1996 | Ciupke et al. | 362/31 |
| 5,319,792 | 6/1994 | Ehlig et al. | 395/800 | 5,486,698 | 1/1996 | Hanson et al. | 250/332 |
| 5,323,002 | 6/1994 | Sampsell et al. | 250/252.1 | 5,486,841 | 1/1996 | Hara et al. | 345/8 |
| 5,325,116 | 6/1994 | Sampsell | 346/108 | 5,488,431 | 1/1996 | Gove et al. | 348/716 |
| 5,327,286 | 7/1994 | Sampsell et al. | 359/561 | 5,489,952 | 2/1996 | Gove et al. | 348/771 |
| 5,330,878 | 7/1994 | Nelson | 430/311 | 5,490,009 | 2/1996 | Venkateswar et al. | 359/291 |
| 5,331,454 | 7/1994 | Hornbeck | 359/224 | 5,491,510 | 2/1996 | Gove | 348/77 |
| 5,339,116 | 8/1994 | Urbanus et al. | 348/716 | 5,491,715 | 2/1996 | Flaxl | 375/344 |
| 5,345,521 | 9/1994 | McDonald et al. | 385/19 | 5,497,172 | 3/1996 | Doherty et al. | 345/85 |
| 5,347,321 | 9/1994 | Gove | 348/663 | 5,497,197 | 3/1996 | Gove et al. | 348/388 |
| 5,347,433 | 9/1994 | Sedlmayr | 362/32 | 5,497,262 | 3/1996 | Kaeriyama | 359/223 |
| 5,348,619 | 9/1994 | Bohannon et al. | 156/664 | 5,499,060 | 3/1996 | Gove et al. | 348/651 |
| 5,349,687 | 9/1994 | Ehlig et al. | 395/800 | 5,499,062 | 3/1996 | Urbanus | 348/771 |
| 5,351,052 | 9/1994 | D'Hout et al. | 342/42 | 5,500,761 | 3/1996 | Goossen et al. | 359/290 |
| 5,357,369 | 10/1994 | Pilling et al. | 359/462 | 5,502,481 | 3/1996 | Dentinger et al. | 348/51 |
| 5,359,349 | 10/1994 | Jambor et al. | 345/168 | 5,504,504 | 4/1996 | Markandey et al. | 345/214 |
| 5,363,220 | 11/1994 | Kuwayama et al. | 359/3 | 5,504,514 | 4/1996 | Nelson | 347/130 |
| 5,365,283 | 11/1994 | Doherty et al. | 348/743 | 5,504,575 | 4/1996 | Stafford | 356/330 |
| 5,367,585 | 11/1994 | Ghezzo et al. | 385/23 | 5,504,614 | 4/1996 | Webb et al. | 359/223 |

| | | | |
|---|---|---|---|
| 5,506,171 | 4/1996 | Leonard et al. | 437/187 |
| 5,506,597 | 4/1996 | Thompson et al. | 345/85 |
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,519,450 | 5/1996 | Urbanus et al. | 348/600 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |

OTHER PUBLICATIONS

F. Sandejas, R. Apte, W. Banyai, D. Bloom, "Surface Microfabrication of Deformable Grating Light Valves For High Resolution Displays," The 7th International Conference on Solid–State Sensors and Actuators, pp. 6 & 7, (no date).

O. Solgaard, F. Sandejas, and D. Bloom, "Deformable Grating Optical Modulator," Optics letters, vol. 17, No. 9, May 1, 1992, New York, USA, pp. 688–690.

R. Apte, F. Sandejas, W. Banyai, D. Bloom, "Grating Light Valves For High Resolution Displays", Ginzton Laboratories, Stanford University, Sanford, CA 94305–4085.

FLAT DIFFRACTION GRATING LIGHT VALVE

FIELD OF THE INVENTION

This invention relates to a method of and an apparatus for modulation of a beam of light. More particularly, this invention is for a substantially flat reflective surface having selectively deformable portions for providing a diffraction grating.

BACKGROUND OF THE INVENTION

Designers and inventors have sought to develop a light modulator which can operate alone or together with other modulators. Such modulators should provide high resolution, high operating speeds (KHz frame rates), multiple gray scale levels, eg., 100 levels or be compatible with the generation of color, a high contrast ratio or modulation depth, have optical flatness, be compatible with VLSI processing techniques, be easy to handle and be relatively low in cost. In attempting to develop just such a system, one of the present inventors co-invented the method and apparatus of U.S. Pat. No. 5,311,360 which is incorporated in its entirety herein by reference.

Figure 1:
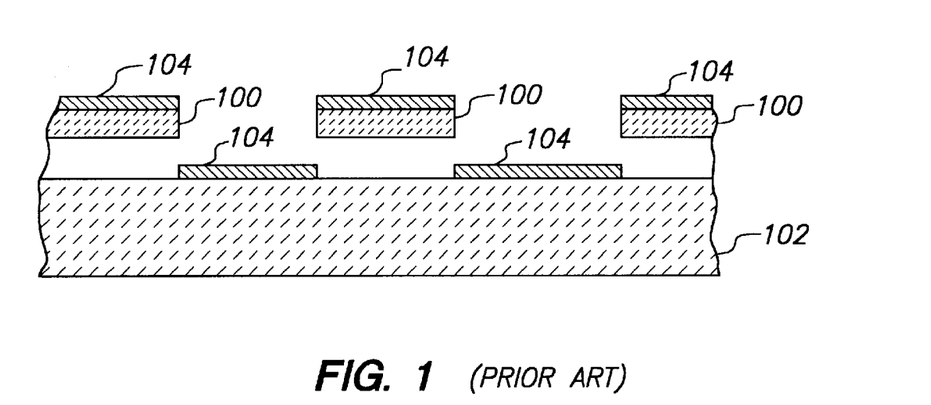
FIG. 1 shows a cross section view of a prior art diffraction grating light valve wherein ribbon elements are in an up position.

According to the teachings of the '360 patent, a diffraction grating is formed of a multiple mirrored-ribbon structure such as shown in FIG. 1. A pattern of a plurality of deformable ribbon structures 100 are formed in a spaced relationship over a substrate 102. Both the ribbons and the substrate between the ribbons are coated with a light reflective material 104 such as an aluminum film. The height difference that is designed between the surface of the reflective material 104 on the ribbons 100 and those on the substrate 102 is $\lambda/2$ when the ribbons are in a relaxed, up state. If light at a wavelength $\lambda$ impinges on this structure perpendicularly to the surface of the substrate 102, the reflected light from the surface of the ribbons 100 will be in phase with the reflected light from the substrate 102. This is because the light which strikes the substrate travels $\lambda/2$ further than the light striking the ribbons and then returns $\lambda/2$, for a total of one complete wavelength $\lambda$. Thus, the structure appears as a flat mirror when a beam of light having a wavelength of $\lambda$ impinges thereon.

Figure 2:
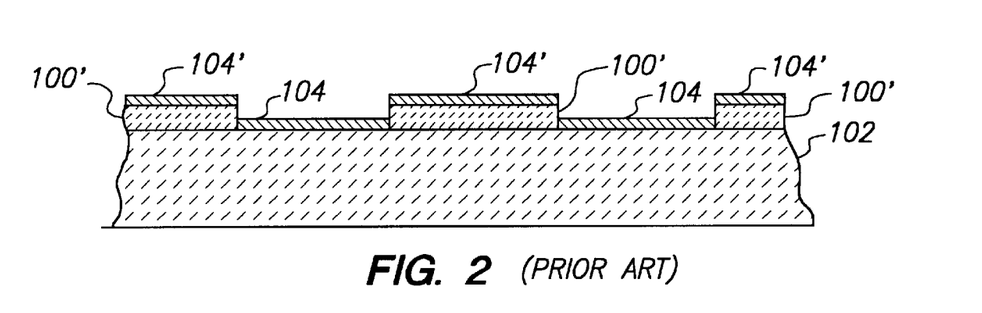
FIG. 2 shows a cross section view of the prior art diffraction grating light valve of FIG. 1 wherein the ribbon elements are in a down position.

By applying appropriate voltages to the ribbons 100 and the substrate 102, the ribbons 100 can be made to bend toward and contact the substrate 102 as shown in FIG. 2. The thickness of the ribbons is designed to be $\lambda/4$. If light at a wavelength $\lambda$ impinges on this structure perpendicularly to the surface of the substrate 102, the reflected light from the surface of the ribbons 100 will be completely out of phase with the reflected light from the substrate 102. This will cause interference between the light from the ribbons and light from the substrate and thus, the structure will diffract the light. Because of the diffraction, the reflected light will come from the surface of the structure at an angle $\Theta$ from perpendicular.

In formulating a display device, one very important criteria is the contrast ratio between a dark pixel and a lighted pixel. The best way to provide a relatively large contrast ratio is to ensure that a dark pixel has no light. One technique for forming a display device using the structure described above, is to have a source of light configured to provide light with a wavelength $\lambda$ which impinges the surface of the structure from the perpendicular. A light collection device, e.g., optical lenses, can be positioned to collect light at the angle $\Theta$. If the ribbons for one pixel are in the up position, all the light will be reflected back to the source and the collection device will receive none of the light. That pixel will appear black. If the ribbons for the pixel are in the down position, the light will be diffracted to the collection device and the pixel will appear bright.

If a wavelength of other than $\lambda$ impinges thereon, there will only be partial reflectivity when the ribbons are in the up state. Similarly, the light will only be partially diffracted to the angle $\Theta$ when the ribbons are in the down state. Thus, the so-called dark pixel will display some light and the so-called bright pixel will not display all the light if the wavelength of the light is not exactly at $\lambda$. It is very expensive to utilize a light source that has only a single wavelength. Commercially viable light sources typically provide light over a range of wavelengths. Because single wavelength light is impractical to provide, the contrast ratio available from a real-world display device that relies on the above principles is much poorer than theoretically possible.

Assume for the sake of argument that single wavelength light were available and commercially viable. For the above described device to function in a way that provides an acceptable contrast ratio requires the heights and thickness of the ribbons and reflecting layers to provide structures that are precisely $\lambda/2$ when up and $\lambda/4$ when down. Because of variances in manufacturing processing, the contrast ratios between any two devices can vary dramatically. Because the likelihood is small that the relative heights will be precisely $\lambda/2$ when up and $\lambda/4$ when down, the contrast ratio will be much poorer than theoretically possible.

Another difficulty with the above described structure results from an artifact of the physical construction. In particular, the inventors have discovered that once in the down position, the ribbons tend to adhere to the substrate. The inventors have learned that texturing the surface of the substrate aids in overcoming this adhesion. Unfortunately, the textured surface substantially degrades the reflective properties of the surface. This degrades the performance of the light valve.

Finally, to achieve color using the above structure, the inventors of the '360 patent envisioned using three distinct valve structures having distinct periodicity of spacings between the ribbons. This structure thereby requires a larger number of ribbons to achieve color. Further, a light source that includes red, green and blue components impinges on these structures to diffract the light to the desired receptors. Accordingly, the intensity of the light is reduced for color.

Figure 3:
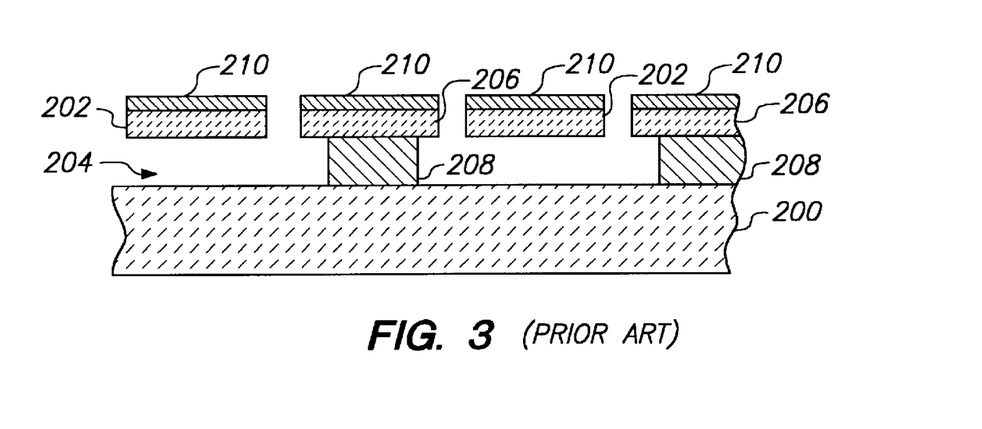
FIG. 3 shows a cross section view of an alternate embodiment prior art diffraction grating light valve having a plurality of planarly arrayed elongated elements, a portion of which are supported by support members.

The '360 patent teaches an alternate structure as shown in FIG. 3. According to this prior art structure, a plurality of elongated elements are disposed over a substrate 200. A first plurality of the elongated elements 202 are suspended by their respective ends (not shown) over an air gap 204 as in the embodiment of FIGS. 1 and 2. A second plurality of the elongated elements 206 are mounted to the substrate 200 via a rigid support member 208. The height of the support members 208 is designed to be $\lambda/4$. A reflective material 210 is formed over the surface of all the elongated elements 202 and 206.

In theory, the elongated elements 202 and 206 are designed to be at the same height when at rest. Thus, when all the elongated elements are up and at the same height there will be no diffraction. (In fact there may be some modest amount of diffraction due to the periodic discontinuities of the gaps between elongated elements. However, this period is half the period of the grating so that it diffracts at twice the angle of the desired diffracted light. Because the optics are configured to pick up diffracted light from only the desired angle, this unwanted diffraction is not captured and does not degrade the contrast ratio.) Indeed, there will be no dependence upon the wavelength of the impinging light for forming a dark pixel if the elongated elements are at the same height.

In order build a structure such as shown in FIG. 3, a layer must be formed of a first material having a predetermined susceptibility to a known etchant. Portions of that layer are removed through known techniques such as photolithography and etching. A second material is then formed in the voids of the removed material such as by deposition. This second material has a known susceptibility to the etchant which is different than the first material. The layer is formed of the elongated element material. This structure is etched to form ribbons of the elongated elements. Finally, the second material is removed by etching to form the suspended elongated elements 202. It is difficult to consistently manufacture the device such that the first material and the second material are coplanar. Thus, the two sets of elongated elements are not likely to be perfectly coplanar. Further, most conventional techniques for forming the selectively removable layers of the first and second materials will provide a support member 208 that will swell (or shrink) during processing. This will further exacerbate the problem because such discontinuities will be at precisely the same period as the desired grating and as such the optics will capture this unwanted diffracted light.

Though there are no drawings, the '360 patent suggests that structure can be built with all the elements suspended. The '360 patent teaches that this is an advantage for controlling amplitude and phase. Unfortunately, there is no teaching as to addressing, biasing or structure to such devices.

What is needed is a flat diffraction grating system that positively maintains a planar relationship between adjacent elongated elements. Further, a system is desired that does not rely upon a predetermined wavelength of light. Additionally, a system is needed that does not required precise manufacturing process tolerances to support predetermined light wavelengths.

SUMMARY OF THE INVENTION

A diffraction grating light valve modulates an incident beam of light. A plurality of elongated elements each have a reflective surface. The elongated elements are suspended with their respective ends substantially coplanar. Alternate ones of the elongated elements are electrically coupled for receiving a first bias voltage. The other elongated elements are electrically coupled for receiving a second bias voltage. By applying an appropriate biasing voltage, all the reflective surfaces can be maintained in a predetermined plane. It will be understood that in fact, the reflective surfaces are not precisely within a single plane due to the fact that a modest sag is induced along the elongated element. Nevertheless, all corresponding points along adjacent elongated elements will be biased to an essentially identical height which effectively prevents diffraction. When all the elongated elements are in the first plane, the diffraction grating light valve reflects the beam of light. A predetermined group of the elongated elements, preferably alternate ones, are deformable to be substantially coplanar in a second plane which is parallel to the first plane. When the predetermined group of elements is in the second plane, the diffraction grating light valve diffracts the beam of light.

DETAILED DESCRIPTION OF THE PREFERRED EMBODIMENT

Figure 4:
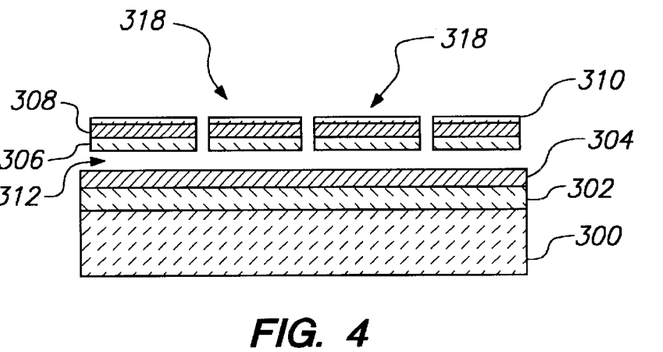
FIG. 4 shows a cross section view of the diffraction grating light valve in the non-diffracting/up mode according to the preferred embodiment.

FIG. 4 shows a cross section view of the diffraction grating light valve in the non-diffracting/up mode according to the preferred embodiment. The details of a manufacturing process are disclosed in a co-owned, co-filed, co-pending U.S. patent application, Ser. No. 08/480,459, entitled A METHOD OF MAKING AND AN APPARATUS FOR A FLAT DIFFRACTION GRATING LIGHT VALVE, and filed concurrently on Jun. 7, 1995 by at least one of the same inventors. Only representative materials are disclosed herein and are not deemed to be in any way limiting.

A substrate 300 is provided and can be any convenient material such as a grown silicon. A passivating layer 302 such as silicon nitride $Si_3N_4$ is formed over the substrate. Next, a conducting layer 304 is formed over the passivating layer 302. Preferably the conducting layer 304 is formed of a material that is resistant to subsequent processing steps, for example tungsten or a tungsten alloy.

A suspended element is formed next and includes layers collectively known as a ribbon 318. The suspended element includes a ribbon layer 306 formed above and spaced from the conducting layer 304. The ribbon layer 306 material is preferably silicon nitride. A reflecting layer 308 is formed on the ribbon layer 306 and is preferably formed of aluminum. Finally, a thin protection layer 310 is formed over the reflecting layer 308 an is preferably a PECVD oxide. An air gap 312 is left between the conducting layer 304 and the ribbon layer 306.

In this up state, because the elongated elements can be driven by appropriate voltages to be precisely the same height, incident light is not diffracted. This provides a true dark pixel when the elongated elements are coplanar. This provides the distinct advantage that the dark state of the pixels is wavelength independent. Recall that there will be a modest amount of diffraction due to the periodic nature of the gaps between adjacent elongated elements. However, the period of this diffraction is half that of the diffraction grating and thus can be eliminated optically.

Figure 5:
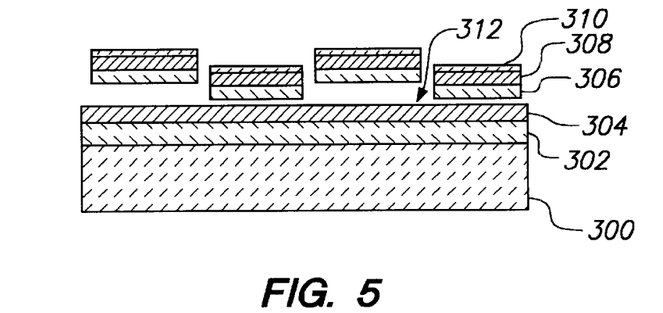
FIG. 5 shows a cross section view of the diffraction grating light valve of FIG. 4 in the diffracting/down mode according to the preferred embodiment.

FIG. 5 shows a cross section view of the diffraction grating light valve of FIG. 4 in the diffracting/down mode according to the preferred embodiment. The same reference numerals will be used where appropriate to identify the same structures when shown in different drawings to avoid confusion. By applying appropriate voltages between predetermined ones of the suspended elements and the conducting layer, electrostatic attractive forces cause those predetermined suspended elements to deform and contact the conducting layer 304. In FIG. 5, the two of the four suspended elements are shown in the down position. This causes diffraction of light reflected from adjacent elements.

Here there is only a modest wavelength dependence for the diffraction grating light valve. It is preferable that the distance between the heights of the adjacent elongated elements is $\lambda/4$. However, if the throw is optimized for green light, the losses due to changing the wavelength to red or blue is on the order of 5%. This is partly due to the fact that the intensity of collected light varies as a sine-squared function of the wavelength. Thus, small changes in wavelength will only have small changes in received intensity. Additionally, the ability to make a device that moves $\lambda/4$ is easier than in the prior art. There, the $\lambda/4$ difference comprises a combination of the spacer thickness and the elongated element thickness. This required very tight manufacturing tolerances for two layers. Here, the thickness of the air gap determines the wavelength conformance of the design; the elongated element can be any thickness. The air gap is preferably formed by removing a sacrificial oxide. Because oxide formation is well characterized under many easily controllable conditions, it is a routine matter to manufacture spacers of the correct dimension. It will be understood that the thickness of the air gap will be adjusted and controlled by the application of voltages to the ribbon or underlying conductor during normal operation of the device.

It is also possible to include a light sensor in an apparatus incorporating the diffraction grating light valve of the present invention. The sensor measures the diffracted light and adjusts the bias voltage (described below) in to maximize the sensed diffracted light. In this way the sensor and bias voltage adjusting circuit can drive the elongated elements that are still in the up position to maintain a precise $\lambda/4$ relationship even though the wavelength of the light source is changed.

Because the losses for such modest wavelength changes are small there will only be a small impact on the contrast ratio because in the dark state, the optical system collects essentially zero light. In an ideal system, where 100% of the light is collected in the on state and zero light is collected in the off state the contrast ratio is $\infty$ (indeed, any number divided by zero is $\infty$). Even modest degradation in the dark state dramatically effects the contrast ratio. For example, if only 5% of unwanted light is collected in the dark state while still 100% of the light is collected in the on state reduces the contrast ratio from $\infty$ to about 20. If on the other hand, the dark state continues to collect zero light but the on state collects 95%, the contrast ratio continues to be $\infty$. Note that the intensity of the display degrades in this example but the contrast ratio remains good.

Because of the relative wavelength independence of the diffraction grating light valve of the present invention, it is possible to build a system that utilizes a single structure to formulate color images. For example, three light sources, including red green and blue, can illuminate a pixel of interest. To formulate red, only the red source is activated. The same is true for green or blue. To make other colors, the pixel can be time multiplexed with the light sources. In other words, first the red source is illuminated and the pixels diffract or not as desired, then the blue and finally the green. The order of illumination is not important. The viewer's eye integrates the colors of the display to perceive the desired color.

Figures 6, 7:
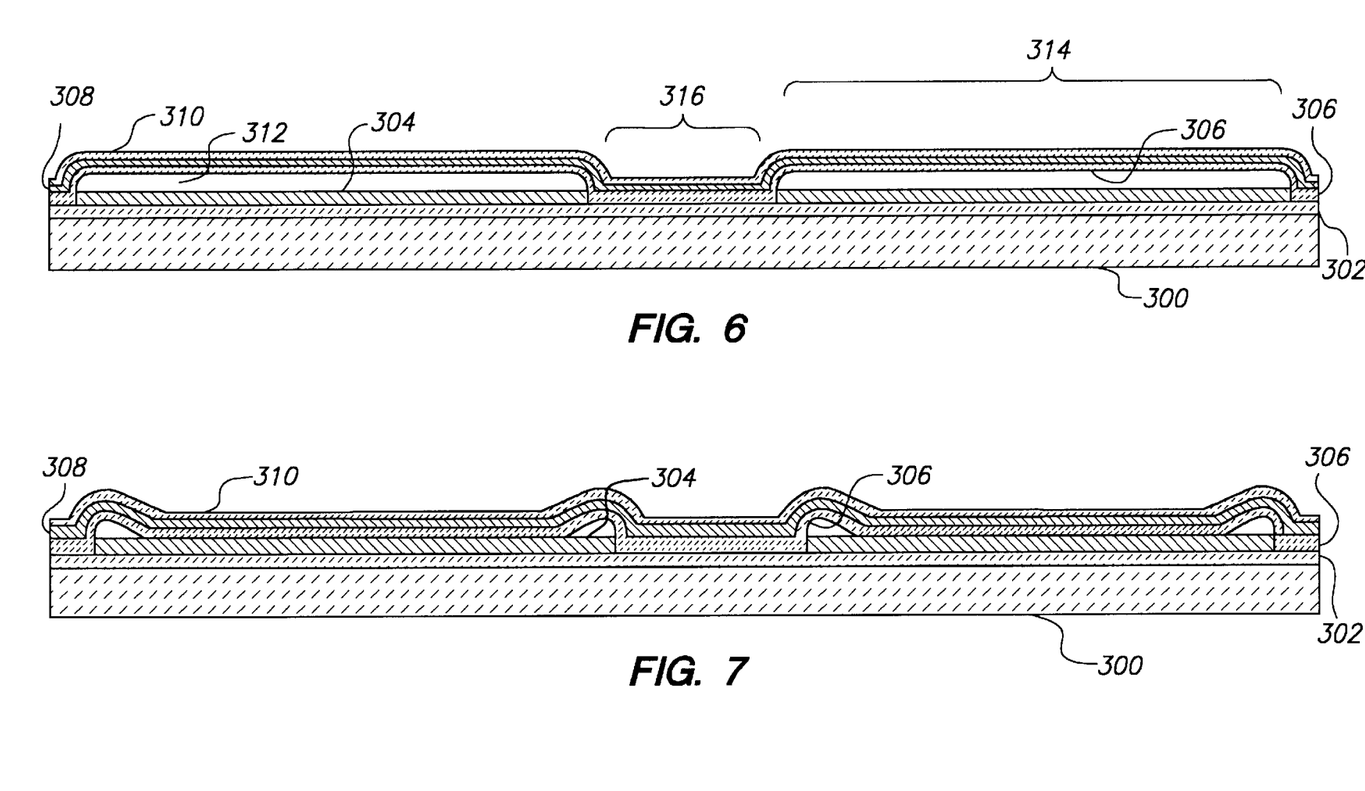
FIG. 6 shows a cross section view of the diffraction grating light valve of FIG. 4 taken through 90° and across two pixels.
FIG. 7 shows a cross section view of the diffraction grating light valve of FIG. 5 taken through 90° and across two pixels.

FIG. 6 shows a cross section view of the diffraction grating light valve of FIG. 4 in the non-diffracting/up mode taken through 90° and across two pixels. FIG. 6 only shows schematically the approximate geometries of the various structures. The various shapes and bending angles can change with process variations, selection of materials, thickness of layers and environmental conditions. A pixel 314 is formed along the suspended region and between anchorages 316. The pixels 314 are suspended to allow for deformation to provide selective diffraction as discussed herein. The anchorages allow separation between pixels 314 and also provide a mechanical support on the substrate 300 for the pixel structure.

FIG. 7 shows a cross section view of the diffraction grating light valve of FIG. 5 in the diffracting/down mode taken through 90° and across two pixels. By applying an appropriate voltage potential between the conducting layer 304 and the reflecting layer 308, an electrostatic attractive force bends the pixel into contact with the substrate. It will be appreciated that the conducting layer 304 extends into and out of the page and passes under many pixels. Similarly, the ribbon 318 from which the pixel is formed passes beyond both borders of the drawing and cross over many conducting layers. This interrelatedness between the pixel ribbons and the conducting layers provides for a unique addressing technique which will be described in more detail in reference to the drawing of FIGS. 8 and 9.

Figure 8:
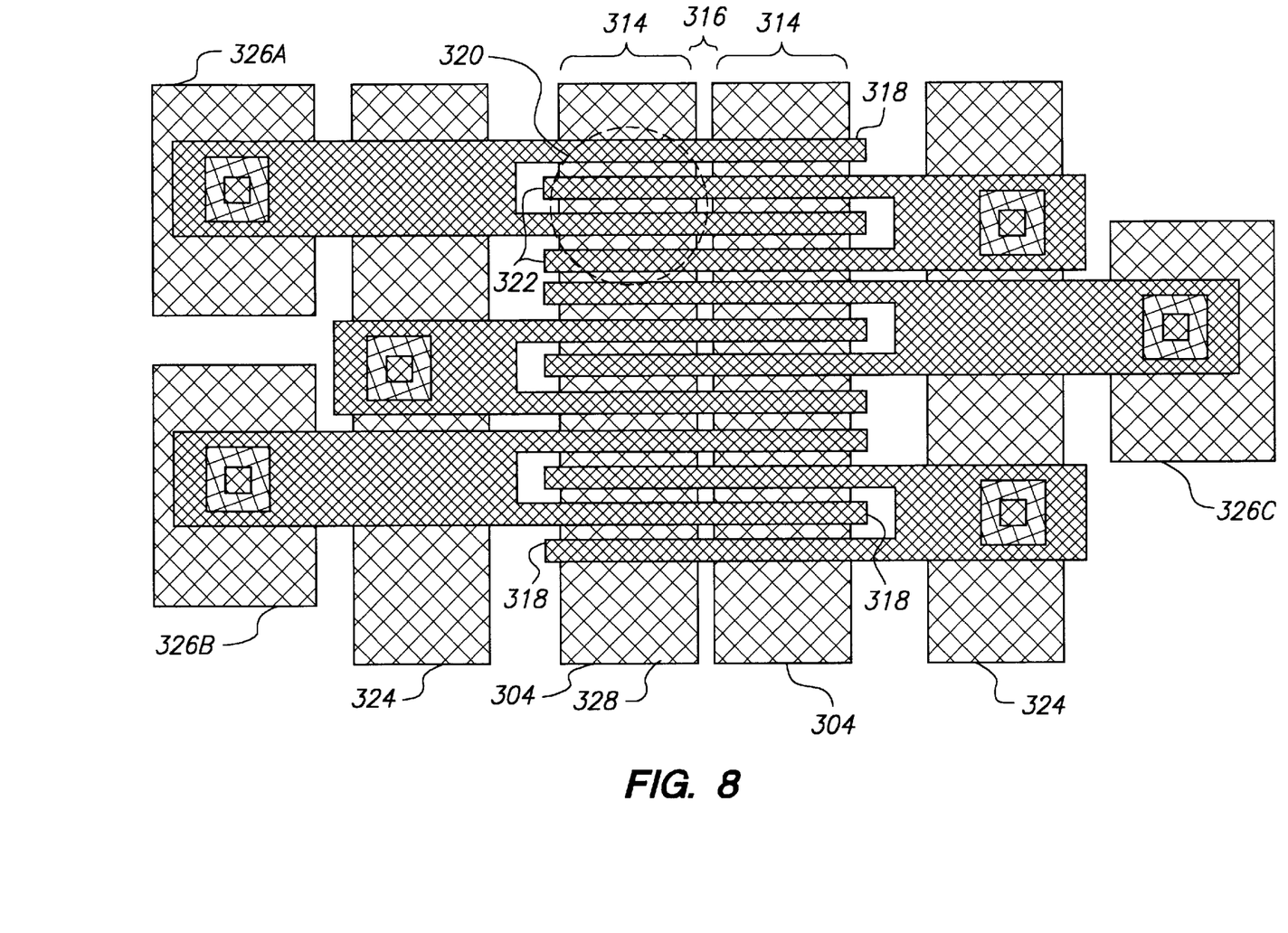
FIG. 8 shows a plan view of the diffraction grating light valve of FIG. 4 and adjacent pixels.

FIG. 8 shows a plan view of the diffraction grating light valve of FIG. 4 and adjacent pixels. Six pixels 320 are shown in the drawing of FIG. 8. It will be appreciated that this limited number of pixels is schematic only. A diffraction grating light valve according to the present invention for a commercially viable display will include at least the number of pixels presently available with other types of display technologies. Thus, for a commercial diffraction grating light valve there will be many more than two conducting layers 304 and many more ribbons 318 than are shown. For example, one commercially available display includes 1024 rows and 1280 columns of pixels. In addition to the pixels, I/O port bonding pads 326 for coupling electric signals to the ribbons 318 are also shown.

Each pixel 320 includes four adjacent ribbons 318. One set 322 of alternating ribbons 318 are coupled to a biasing bus 324. Indeed, two alternating ribbons for each one of the pixels are coupled to the biasing bus 324. The other two ribbons in the pixel 320 are coupled to receive a control voltage from the bond pad 326A. Preferably the biasing bus 324 is formed at the same time as the conducting layer 304.

The angle the light is deflected is determined by the width of the ribbons 318 and the spacing between adjacent ribbons. Because alternate ribbons are toggled in the preferred embodiment, the period is defined by two adjacent ribbons. In the preferred embodiment, the ribbons are 3.5 microns wide and the space between adjacent ribbons is 1.5 microns. Thus, the period of the structure is 10 microns. It will be appreciated that the space between the ribbons causes light to be lost. It is preferable that the space be minimized relative to the width of the ribbons.

Figure 9:
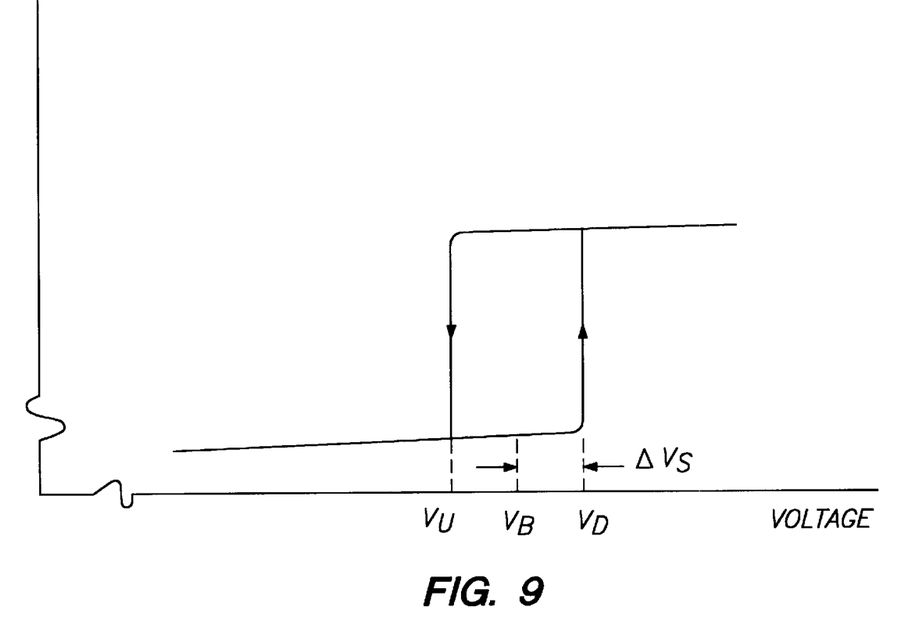
FIG. 9 is a graph showing the intensity of light from one of the elongated elements of FIG. 4 relative to a voltage applied between the elongated element and the substrate in the case where no bias voltage is applied.

FIG. 9 is a graph showing the intensity of light from a display structure of two pairs of elongated elements of FIG. 4 relative to a voltage applied between an elongated element and the substrate in the case where alternate lines are not biased. The elongated elements exhibit a hysteresis. The elongated element begins to bend slightly as the voltage is increased as exhibited by an increase in light intensity. At a bend threshold $V_D$, the elongated element snaps down into contact with the conductive layer. The voltage can then be reduced below that level and the elongated element will remain in the down position. At some lower voltage $V_U$, the elongated element will relax and return to the up position.

The voltage $V_D$ necessary to cause an elongated element to snap into the down position is in the range of 20 volts DC. Depending upon the manufacturing processes, materials and layer thicknesses used to build such devices it is possible that this voltage could range significantly above and below that value. In the preferred embodiment, the elongated elements are biased at a midrange voltage $V_B$ between the bend voltage $V_D$ and the lower voltage $V_U$. In this way, a considerably smaller voltage excursion is required to cause an elongated element to snap or relax.

It is apparent from studying the graph of FIG. 9 that the bias voltage $V_B$ will cause some modest flexing of the elongated elements. Consider the voltages necessary to switch the pixel 320. For this discussion, reference will be made to both FIGS. 8 and 9. In one addressing scheme, the bias voltage $V_B$ is applied to all the ribbons of the pixel by applying $V_B$ to the bond pad 326A and to the conductor 324. All the ribbons in the pixel 320 will flex slightly and remain planar so that the dark state remains dark. In the preferred embodiment, every other ribbon is permanently coupled to the bias voltage $V_B$. The voltage on the respective interdigitated ribbons is changed up or down to cause those ribbons to snap down or relax up.

The incremental voltage necessary to switch the ribbon is $\Delta V_S$ as shown in FIG. 9. If at least $\Delta V_S$ were added to the voltage applied to the bond pad 326A, all the pixels in the row connected to that bond pad would toggle down to the diffracting state. Alternatively, if $\Delta V_S$ were subtracted from the voltage applied to the conducting layer 328 (also labeled 304 to show the correspondence to FIGS. 4–7), all the ribbons of all the pixels in column above this conducting layer would also toggle down. Under these conditions, the ribbons would all be in the down state so that these pixels would remain dark. To provide addressing of the pixel 320, the voltage $\Delta V_S/2$ is added to the bond pad 326A and the voltage $\Delta V_S/2$ is subtracted from the conducting layer 328. Any other voltage combination can be used so long as neither voltage alone will cause the ribbons to toggle down but the combination of both do cause the ribbons to toggle down.

Once the $+\Delta V_S/2$ and $-\Delta V_S/2$ are removed, the ribbons that were toggled into the down position will remain down due to the inherent hysteresis of the ribbons until $\Delta V_S$ of the opposite polarity is applied across the same elements. To avoid erasing an entire row or column at once, a single pixel 320 can be erased by appropriately applying $\pm\Delta V_S/2$ to the row and column with the opposite polarity used to toggle the pixel 320 down. As described above, other combinations of voltages can be used to erase a pixel 320.

In the preferred embodiment, a row of data is set up and then toggled into the row. If the conducting layers 304 comprise the columns, the data is placed onto the columns by appropriately coupling $-\Delta V_S/2$ to all the columns wherein the pixels are desired to be bright. Even though all the ribbons for all the pixels in each such columns will move slightly as a result of this change in voltage, there will be no change in the image displayed because these ribbons remain coplanar. Thus, the ribbons move common mode so there is common mode rejection of any such changes. In other words, because the electrostatic attractive force is equally applied to all the elongated elements in a row those ribbons move together and unwanted diffraction is prevented. It will be understood that in fact, the reflective surfaces are not precisely within a single plane due to the fact that a modest sag is induced along the elongated element. Nevertheless, all corresponding points along adjacent elongated elements will be biased to an essentially identical height which effectively prevents diffraction. The voltage on the bond pads coupled to ribbons that move in the desired row is then raised from $V_B$ to $(V_B+\Delta V_S/2)$ and all the appropriate pixels will be toggled. If on the other hand, the data were set up on the ribbons and then toggled in with the underlying conducting layer, the display would twinkle in response to the $\Delta V_S/2$ being selectively applied to predetermined ones of the ribbons.

The present invention has been described relative to a preferred embodiment. Improvements or modifications that become apparent to persons of ordinary skill in the art only after reading this disclosure are deemed within the spirit and scope of the application.

What is claimed is:

1. A modulator for modulating an incident beam of light comprising:
    a. a plurality of elongated elements, each element having a first end and a second end and a light reflective planar surface, wherein the elements are grouped into a first group and a second group such that the elements of the first group are interdigitated with the elements of the second group, the elements being arranged parallel to each other;
    b. means for suspending the elements of the first group and the second group by their ends;
    c. means for electrically coupling all the elongated elements of the first group in each row together;
    d. means for electrically coupling all the elongated elements of the second group in each row together;
    e. means for applying a first bias voltage to the first group and means for applying a second bias voltage to the second group such that the reflective surfaces are substantially coplanar and in a first plane such that the incident beam of light is reflected; and
    f. means for selectively deflecting the elements of the first group perpendicular to the first plane toward a second plane which is parallel to the first plane such that the incident beam of light is diffracted.

2. The modulator according to claim 1 further comprising means for adjusting a position of the second group perpendicular to the first plane, independently of the first group.

3. The modulator according to claim 1 wherein adjacent elements are spaced from one another by a gap such that the extent of each reflective surface is larger than each gap.

4. The modulator according to claim 1 wherein the second plane is approximately $\lambda/4$ from the first plane, where $\lambda$ is the wavelength of the bean of light.

5. The modulator according to claim 1 wherein the elements do not lie in the first plane when the first bias voltage is removed.

6. The modulator according to claim 1 wherein an electrostatic attraction is formed by applying the first bias voltage and the second bias voltage as an electrical potential across the elements and an underlying conductor.

7. The modulator according to claim 1 further comprising a means for sensing a diffracted light and for automatically adjusting the electrical bias in response thereto.

8. The modulator according to claim 1 wherein the elements reflect light when in the second plane regardless of wavelength.

9. A digital display system for displaying an image comprising:

a. a plurality of pixels, each pixel for displaying a portion of the image, wherein the pixels are arranged in an array having a plurality of rows and plurality of columns, and further wherein each pixel comprises:

(1) a plurality of elongated elements, each element having a first end and a second end and a light reflective planar surface, wherein the elements are grouped into a first group and a second group such that the elements of the first group are interdigitated with the elements of the second group, the elements being arranged parallel to each other; and (2) means for suspending the elements of the first group and the second group over a substrate by their ends;

b. means for electrically coupling all the elongated elements of the first group in each row together;

c. means for electrically coupling all the elongated elements of the second group in each row together;

d. means for applying a first bias voltage to the first group and means for applying a second bias voltage to the second group such that the reflective surfaces are substantially coplanar and in a first plane such that the incident beam of light is reflected; and e. means for selectively deflecting the elements of the first group perpendicular to the plane to a second plane which is parallel to the first plane such that the incident beam of light is diffracted.

10. The apparatus according to claim 9 wherein the means for selectively deflecting the elements of the first group comprises a conductive layer mounted to the substrate and under all the elongated elements in a column.

* * * * *

UNITED STATES PATENT AND TRADEMARK OFFICE
CERTIFICATE OF CORRECTION

PATENT NO. : 5,841,579

DATED : November 24, 1998

INVENTOR(S) : Bloom et al.

It is certified that error appears in the above-identified patent and that said Letters Patent is hereby correct as shown below:

On page 2, under U.S. Patent Documents, U.S. Patent Number 4,468,725, delete "Venturii" and replace with --Venturini--.

On page 4, under Other Publications, reference "Grating Light Valves for High Resolution Displays", delete "Sanford" and replace with --Stanford--.

In the Claims:

Claim 4, col. 8, ln. 57, delete "bean" and replace with --beam--.

Signed and Sealed this

Fourteenth Day of November, 2000

Attest:

Q. TODD DICKINSON

*Attesting Officer*   *Director of Patents and Trademarks*